United States Patent
Ward

(10) Patent No.: US 10,308,363 B2
(45) Date of Patent: Jun. 4, 2019

(54) SEAT FOOTREST

(71) Applicant: Textron Aviation Inc., Wichita, KS (US)

(72) Inventor: Barry John Ward, Bel Aire, KS (US)

(73) Assignee: Textron Innovations, Inc., Providence, RI (US)

(*) Notice: Subject to any disclaimer, the term of this patent is extended or adjusted under 35 U.S.C. 154(b) by 0 days.

(21) Appl. No.: 15/848,094

(22) Filed: Dec. 20, 2017

(65) Prior Publication Data

US 2018/0178915 A1   Jun. 28, 2018

Related U.S. Application Data

(60) Provisional application No. 62/437,896, filed on Dec. 22, 2016.

(51) Int. Cl.
*A47C 7/50* (2006.01)
*B64D 11/06* (2006.01)

(52) U.S. Cl.
CPC .......... *B64D 11/0643* (2014.12); *A47C 7/506* (2013.01)

(58) Field of Classification Search
CPC ............................ B64D 11/0643; A47C 7/506
USPC ................................................... 297/423.28
See application file for complete search history.

(56) References Cited

U.S. PATENT DOCUMENTS

| | | | |
|---|---|---|---|
| 4,819,987 A | 4/1989 | Stringer | |
| 5,352,020 A | 10/1994 | Wade et al. | |
| 6,695,406 B2 | 2/2004 | Plant | |
| 8,444,225 B2 | 5/2013 | Behe | |
| 8,444,226 B2 | 5/2013 | Driessen et al. | |
| 8,708,417 B2* | 4/2014 | Mejuhas | B60N 2/62 297/423.28 |
| 8,944,513 B2* | 2/2015 | Suzuki | B60N 2/995 297/423.28 |
| 2014/0292052 A1 | 10/2014 | Parker et al. | |
| 2017/0174105 A1* | 6/2017 | An | B60N 2/0232 |

* cited by examiner

*Primary Examiner* — Anthony D Barfield
(74) *Attorney, Agent, or Firm* — Erise IP, P.A.

(57) ABSTRACT

A seat footrest includes a footpad having a supporting plate under a cushioned top side, an arcuate member mechanically coupled to the plate by a first end and pivotally coupled to a seat frame by a second end. The arcuate member is adapted for pivoting the footpad between a stowed position and one or more deployed positions. A lock pin is provided for releasably inserting into a first notch of the arcuate member for securing the footpad in the stowed position and one or more additional notches of the arcuate member for securing the footpad in the one or more deployed positions. A first biasing member is adapted for initiating deployment of the footpad upon release of the lock pin from the first notch, and a second biasing member is adapted for completing deployment of the footpad by raising the footpad to the one or more deployed positions.

20 Claims, 12 Drawing Sheets

SEAT FOOTREST

CROSS-REFERENCE TO RELATED APPLICATIONS

This application claims the benefit of U.S. Provisional Patent Application Ser. No. 62/437,896 entitled Seat Footrest and filed on Dec. 22, 2016, the disclosure of which is herein incorporated by reference in its entirety.

BACKGROUND

1. Field of the Disclosure

Embodiments of this disclosure relate generally to footrests for seats. More specifically, embodiments of this disclosure relate to stowable footrests for aircraft passenger seats.

2. Description of the Related Art

Existing seat footrests may be unable to extend far enough to accommodate taller occupants, or they may be difficult to stow due to excessive spring forces needed to deploy the footrest. Additionally, many existing seat footrests are unable to reach a horizontal position.

U.S. Pat. No. 8,444,225 to Behe discloses a legrest with a lockable gas spring cylinder and a foot support that telescopically extends from a calf support, but the legrest of Behe does not reach a horizontal position.

U.S. Pat. No. 8,444,226 to Driessen et al. discloses a leg rest assembly with a gas spring; however, the legrest does not reach a horizontal position and does not include a telescoping extendable footrest.

U.S. Pat. No. 6,695,406 to Plant discloses a reclinable passenger seat with a legrest extension diaphragm that telescopes to lengthen or shorten the overall length of the legrest; however, the legrest of Plant lacks a gas spring and does not reach a horizontal position.

U.S. Pat. No. 5,352,020 to Wade et al. discloses two hydraulic locking cylinders for extending and retracting the footrest, respectively; however, the legrest assembly of Wade does not reach a horizontal position.

U.S. Pat. No. 4,819,987 to Stringer discloses a legrest that is extended by an actuation assembly that includes a hydraulic actuator of the piston/cylinder type; however, the legrest assembly of Stringer does not reach a horizontal position.

US Application 2014/0292052 to Parker et al. discloses a reclining lounger chair that includes a gas spring connected to a set of linkages to extend a seat footrest.

SUMMARY

In an embodiment, a seat footrest is provided. The seat footrest includes an arcuate member mechanically coupled to a footpad by a first end and pivotally coupled to a seat frame by a second end, opposite the first end, wherein the arcuate member is adapted for pivoting the footpad between a stowed position and one or more deployed positions. The seat footrest further includes a lock pin for releasably inserting into a first notch of the arcuate member for securing the footpad in the stowed position and one or more additional notches of the arcuate member for securing the footpad in the one or more deployed positions, a first biasing member adapted for initiating deployment of the footpad upon release of the lock pin from the first notch, and a second biasing member adapted for completing deployment of the footpad by raising the footpad to the one or more deployed positions such that the lock pin inserts into the one or more additional notches, respectively.

In another embodiment, a stowable footrest for a seat is provided. The stowable footrest includes a footpad having a supporting member, a first arcuate member mechanically coupled to a first side of the supporting member, and a second arcuate member mechanically coupled to a second side of the supporting member, opposite the first side. The first arcuate member and the second arcuate member are pivotably coupled to a seat frame for pivoting the footpad between a stowed configuration and a plurality of deployed configurations. At least one of the first arcuate member and the second arcuate member have a first notch corresponding to the stowed configuration and a plurality of additional notches each corresponding to a respective one of the plurality of deployed configurations. A lock pin is provided for inserting into one of the first notch or the plurality of additional notches for securing the footpad in the stowed configuration or in the plurality of deployed configurations, respectively. A telescoping slide is embedded in the supporting member for extending a position of the footpad away from the seat.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure include a seat footrest having two torsion springs to start footrest pivot motion and four gas springs to push the footrest to a substantially horizontal orientation. Certain embodiments include a telescoping ability to extend the length of the footrest, and cable reels to retrieve the footrest once released by actuating a touch latch mechanism. Improved seat footrests that stow compactly, reach a substantially horizontal orientation, automatically retract under excessive load to prevent damage, and telescope to accommodate both short and tall passengers are provided.

Figure 1:
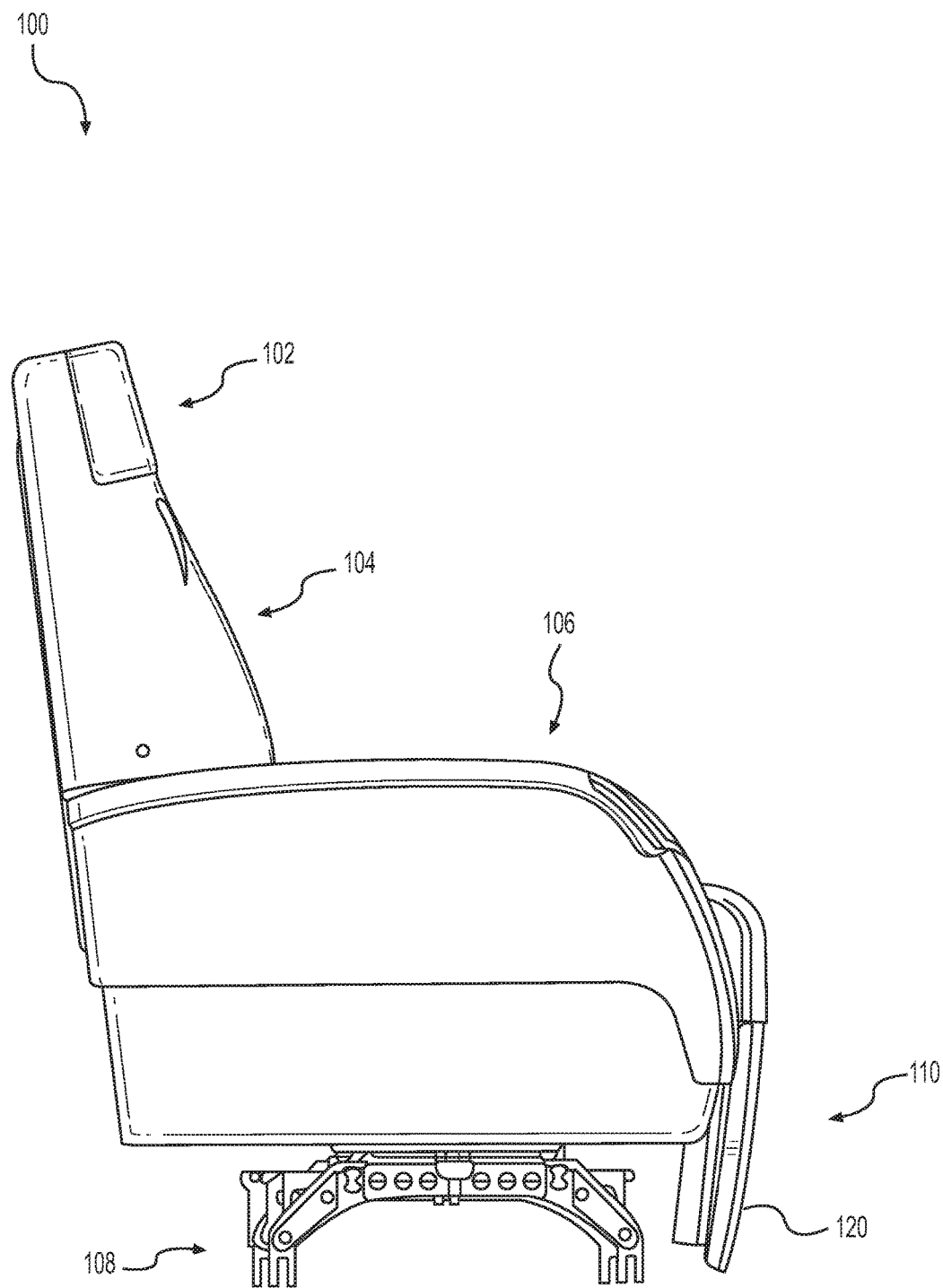
FIG. 1 is a side view showing a seat with an embodiment of a footrest in a stowed position.

FIG. 1 is a side view showing a seat 100 with an exemplary footrest 110 in a stowed position. Seat 100 includes a headrest 102, a back 104, and an armrest 106 configured for a supporting a seated occupant. A base 108 is configured for mounting to an aircraft cabin floor and may include a swiveling capability for rotating the orientation of seat 100. Footrest 110 is substantially vertically oriented when in the stowed position and includes a footpad 120.

Figure 2:
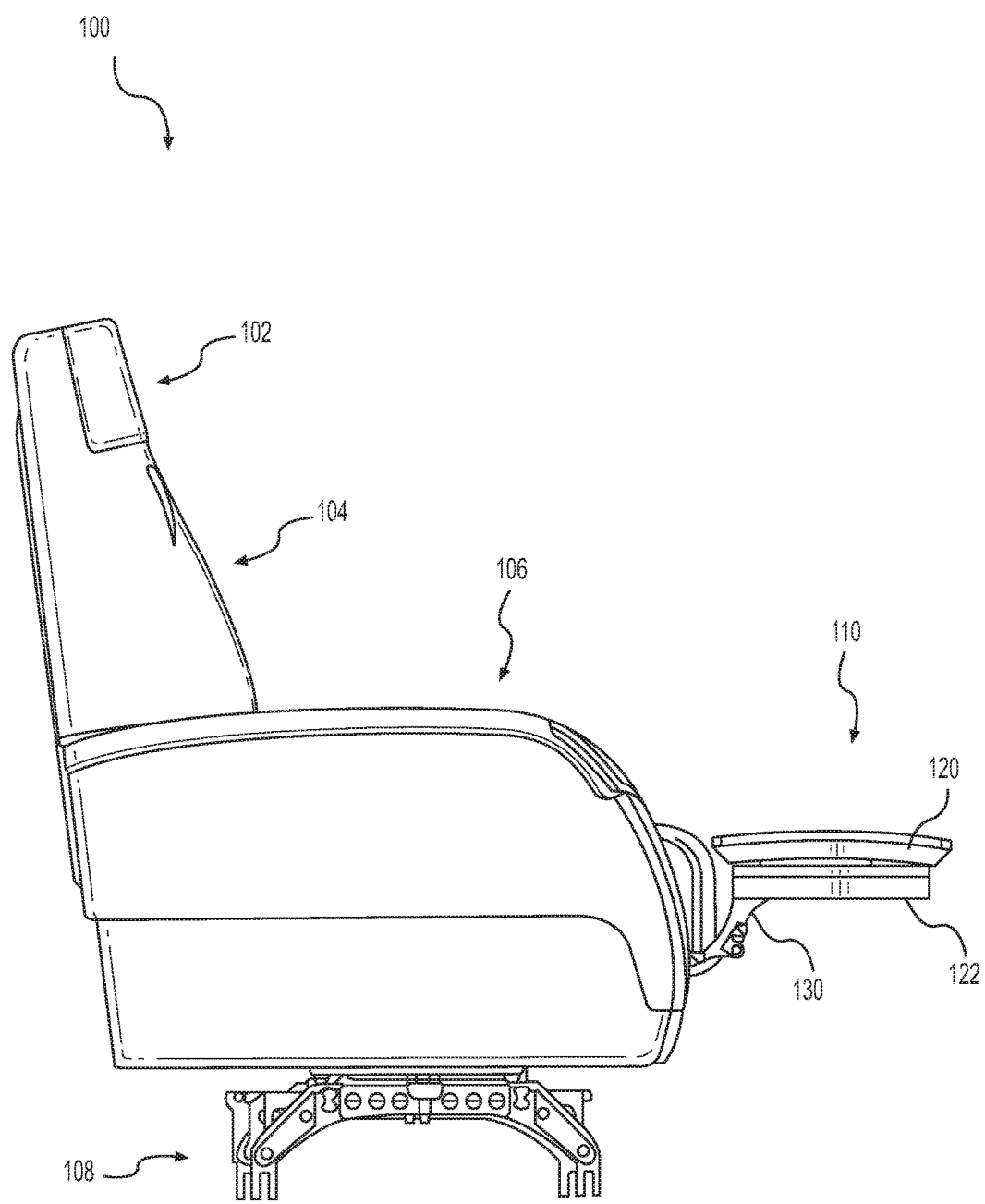
FIG. 2 is a side view showing the seat of FIG. 1 with the footrest in a fully deployed position.

FIG. 2 is a side view showing seat 100, FIG. 1 with footrest 110 in a fully deployed position. In the fully deployed position, footrest 110 pivots straight out in front of seat 100 such that footrest 110 is substantially horizontal. In the present disclosure, substantially horizontal should be interpreted to mean substantially parallel with the floor upon which seat 100 rests. Available positions of footrest 110 include fully deployed (as depicted in FIG. 2), stowed (as depicted in FIG. 1), or partially deployed (not shown). Partially deployed positions may include one or more positions in which footrest 110 is angled between the fully stowed and fully deployed positions. Fully and partially deployed positions may be used by a seated occupant for reclining in seat 100.

A first arcuate member 130 is mechanically coupled to a footrest plate 122 for supporting footpad 120. Footrest plate 122 is a supporting plate (e.g., a machined aluminum plate) that provides a rigid structure on an underside of footpad 120. Footpad 120 includes a cushioned top side, opposite the underside. In certain embodiments, footpad 120 provides a cushioned top surface configured for comfortably supporting the feet and/or legs of a seated occupant.

In operation, footrest 110 is deployed from the stowed position by disengaging a releasable lock pin from first arcuate member 130, which allows a first biasing member to initiate deployment of footrest 110, followed by completion of deployment via a second biasing member, as further described below in connection with FIGS. 4 and 5. The lock pin may be reengaged with first arcuate member 130 to secure footrest 110 in a deployed position. Upon deployment of footrest 110, footpad 120 may be slid to an extended position via a telescoping mechanism housed within footrest plate 122, as depicted in FIG. 3.

Figure 3:
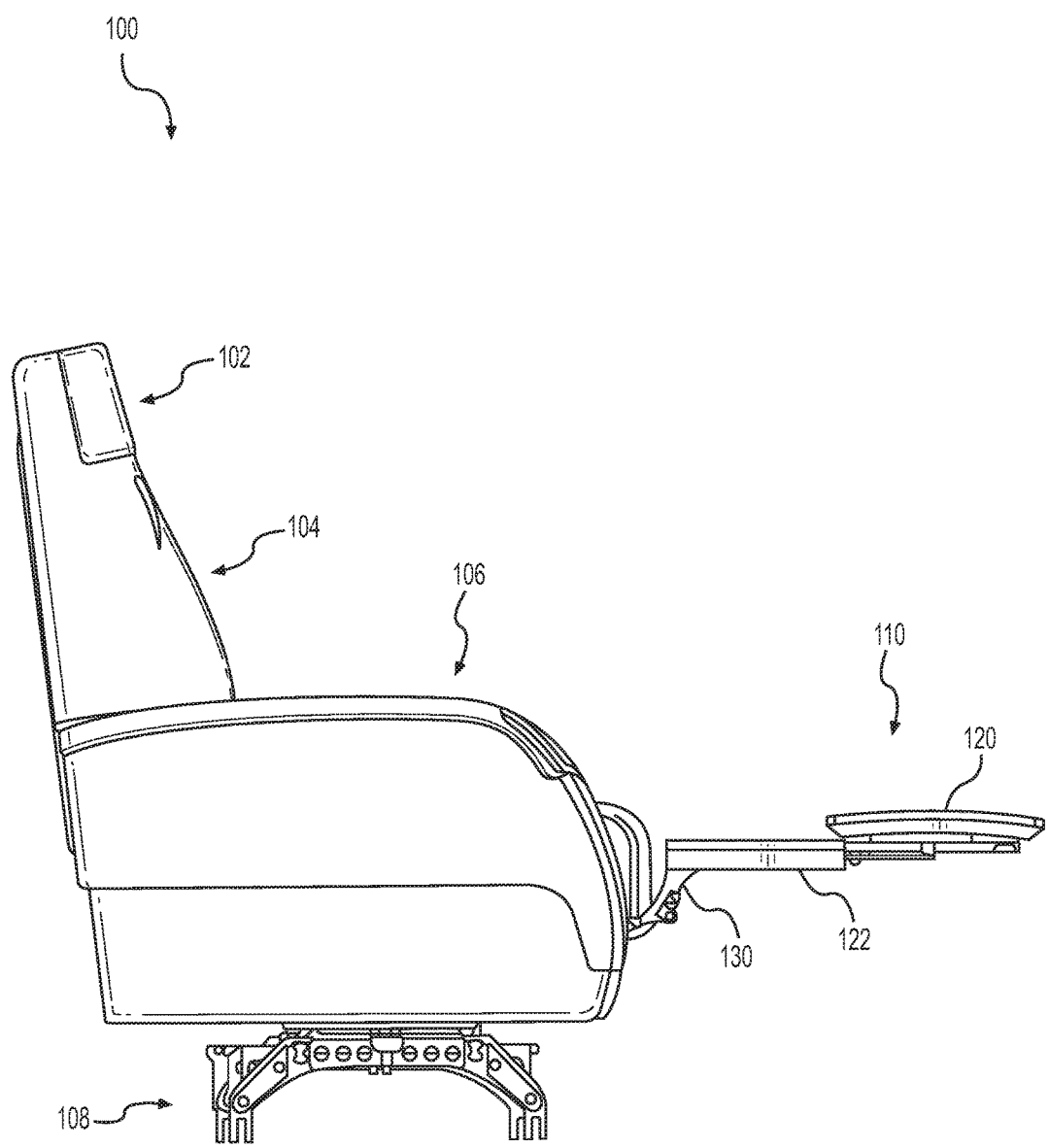
FIG. 3 is a side view showing the seat of FIG. 1 with the footrest in a deployed position and an embodiment of a footpad in an extended position.

FIG. 3 is a side view showing seat 100 with footrest 110 in a deployed position, and footpad 120 in the extended position. Available positions of footpad 120 include extended (as depicted in FIG. 3), retracted (as depicted in FIG. 2), or partially extended (not shown). Partially extended positions may include one or more positions between fully retracted and fully extended. By adjusting an amount of extension of footpad 120, seated occupants of various heights may be accommodated. Operation of footpad 120 extension is further described below in connection with FIGS. 6 and 7.

Figure 4:
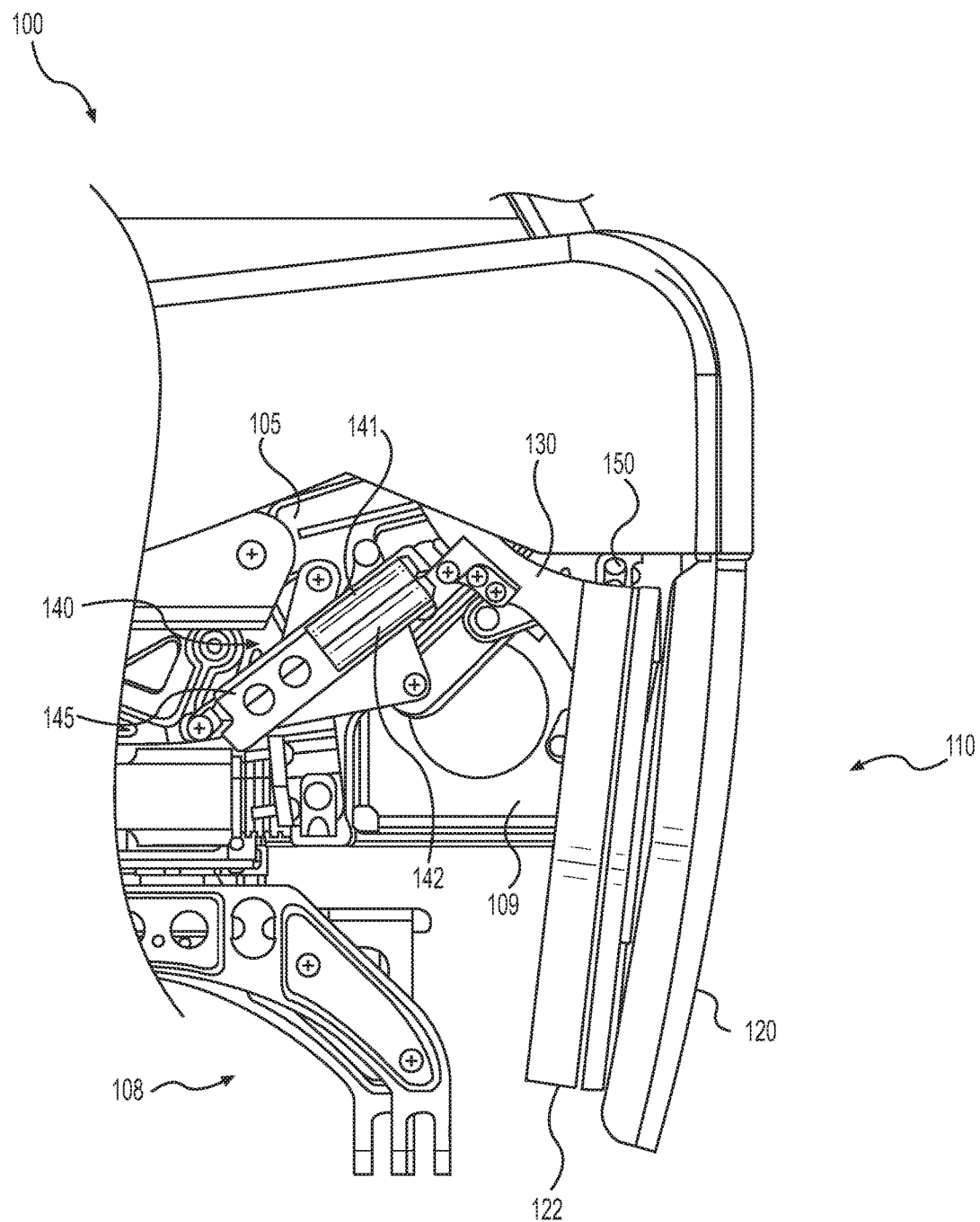
FIG. 4 is a side view showing the seat of FIG. 1 with the footrest in the stowed position, and an armrest removed from the seat to enable viewing of internal components.

FIG. 4 is a side view showing seat 100 with footrest 110 in the stowed position, and armrest 106 removed to enable viewing of internal components. FIG. 5 is a side view showing seat 100 with footrest 110 in a fully deployed position. FIGS. 4 and 5 are best viewed together with the following description.

Figure 5:
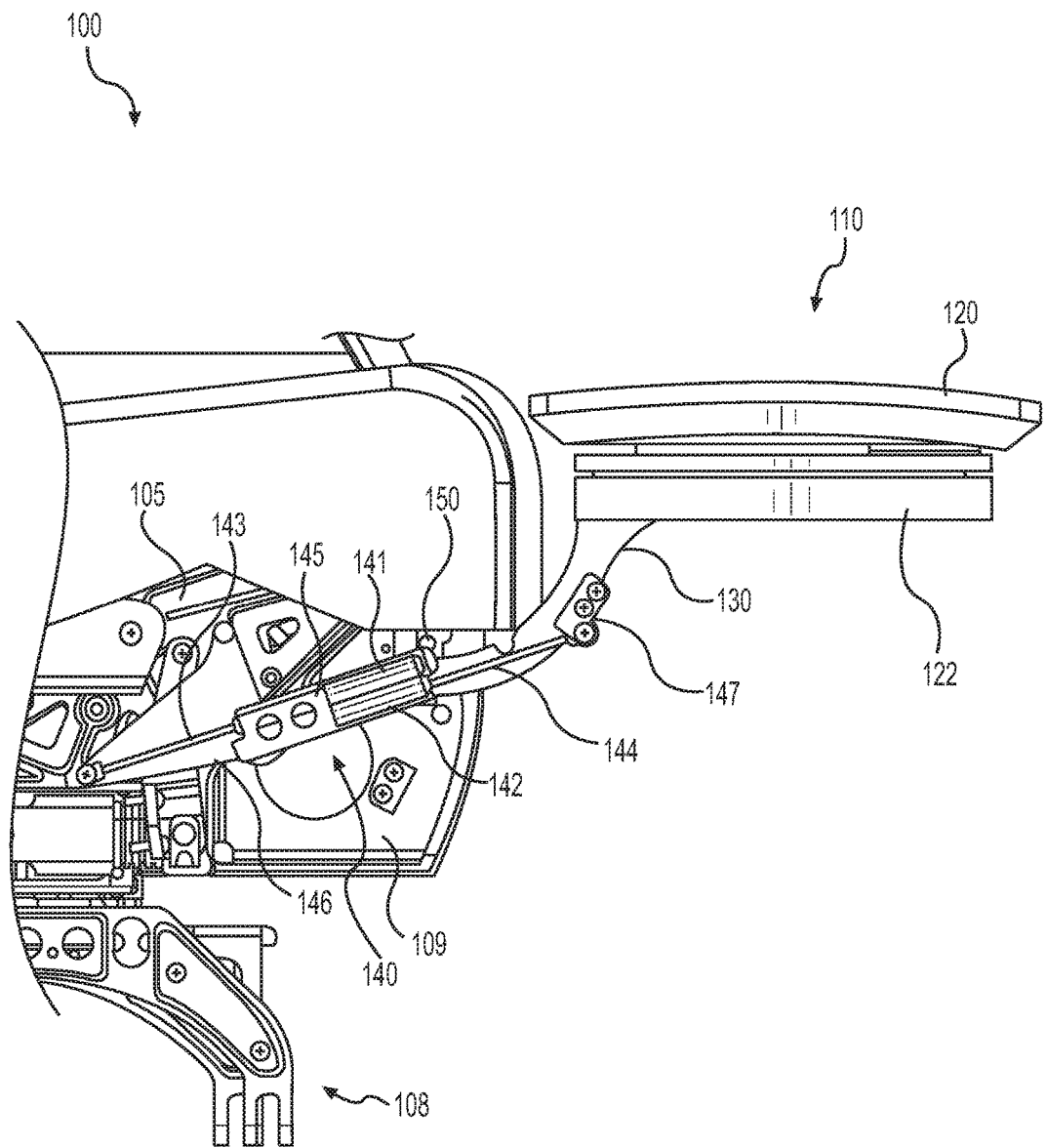
FIG. 5 is a side view showing the seat of FIG. 1 with the footrest in the fully deployed position, and the armrest removed to enable viewing of internal components.

In certain embodiments, footrest 110 deploys from the stowed position depicted in FIG. 4 to the fully deployed position depicted in FIG. 5 in two stages. Initially, a first biasing member initiates pivoting of first arcuate member 130 such that footrest 110 rotates away from seat 100. Subsequently, a second biasing member drives first arcuate member 130 upwards to complete deployment of footrest 110. The first biasing member is for example a torsion spring (not shown) adapted for providing a torque to initiate rotation of first arcuate member 130 about a pivot axis (see pivot axis 135, FIG. 12) in a seat frame 105. The second biasing member is for example a compression spring or gas spring adapted to provide a longitudinal extension force. As depicted in FIGS. 4 and 5, an exemplary second biasing member is a dual gas-spring assembly, such as a first dual gas-spring assembly 140. In certain embodiments, a second dual gas-spring assembly may be located on a far side of seat 100 and aligned with first dual gas-spring assembly 140 (see e.g., second gas spring assembly 148, FIG. 11). First dual gas-spring assembly 140 includes a first gas spring 141 aligned antiparallel with a second gas spring 142. In other words, first gas spring 141 is parallel with, and facing a direction opposite of, second gas spring 142. First and second gas springs 141, 142 are held adjacent to one another via a coupling member 145, and are configured to work together to raise footrest 110 to the deployed position, as further described below.

A lock pin 150 is provided to engage in one or more notches (e.g., slots) of first arcuate member 130 for maintaining footrest 110 in one or more deployed positions. Lock pin 150 may be biased (e.g., spring loaded) to engage in the one or more notches of first arcuate member 130. A release cable or other release mechanism may be used to retract lock pin 150 from the one or more notches of first arcuate member 130 for enabling movement of footrest 110 between stowed and deployed positions (see e.g., release cable 155, FIG. 10).

Other components of seat 100 may be visible but not associated with footrest 110 (e.g., a life vest box 109). Some of these components may not be labeled for clarity of illustration.

FIG. 5 is a side view showing seat 100 with footrest 110 in a fully deployed position with armrest 106 removed to enable viewing of internal components. First and second gas springs 141, 142 may each include a cylinder containing compressed gas and a piston configured to compress the gas. In the fully deployed position of footrest 110, a piston rod extends from each respective gas spring, as viewed in FIG. 5. For example, a first piston rod 143 extends from first gas spring 141, and a second piston rod 144 extends from second gas spring 142. First piston rod 143 is mechanically coupled to a supporting member 146 that is mechanically coupled to seat frame 105. Second gas spring 144 is mechanically coupled to first arcuate member 130 via a bracket 147.

In operation, when lock pin 150 is freed from a notch of first arcuate member 130, first and second gas springs 141, 142 expand such that first piston rod 143 and second piston rod 144 extend to deploy footrest 110. In certain embodiments, a first biasing member (not shown) is mechanically coupled to the pivot axis (see pivot axis 135, FIG. 12) of first arcuate member 130 for initiating deployment of footrest 110. After initial deployment, first and second gas springs 141, 142 complete the deployment.

Figure 6:
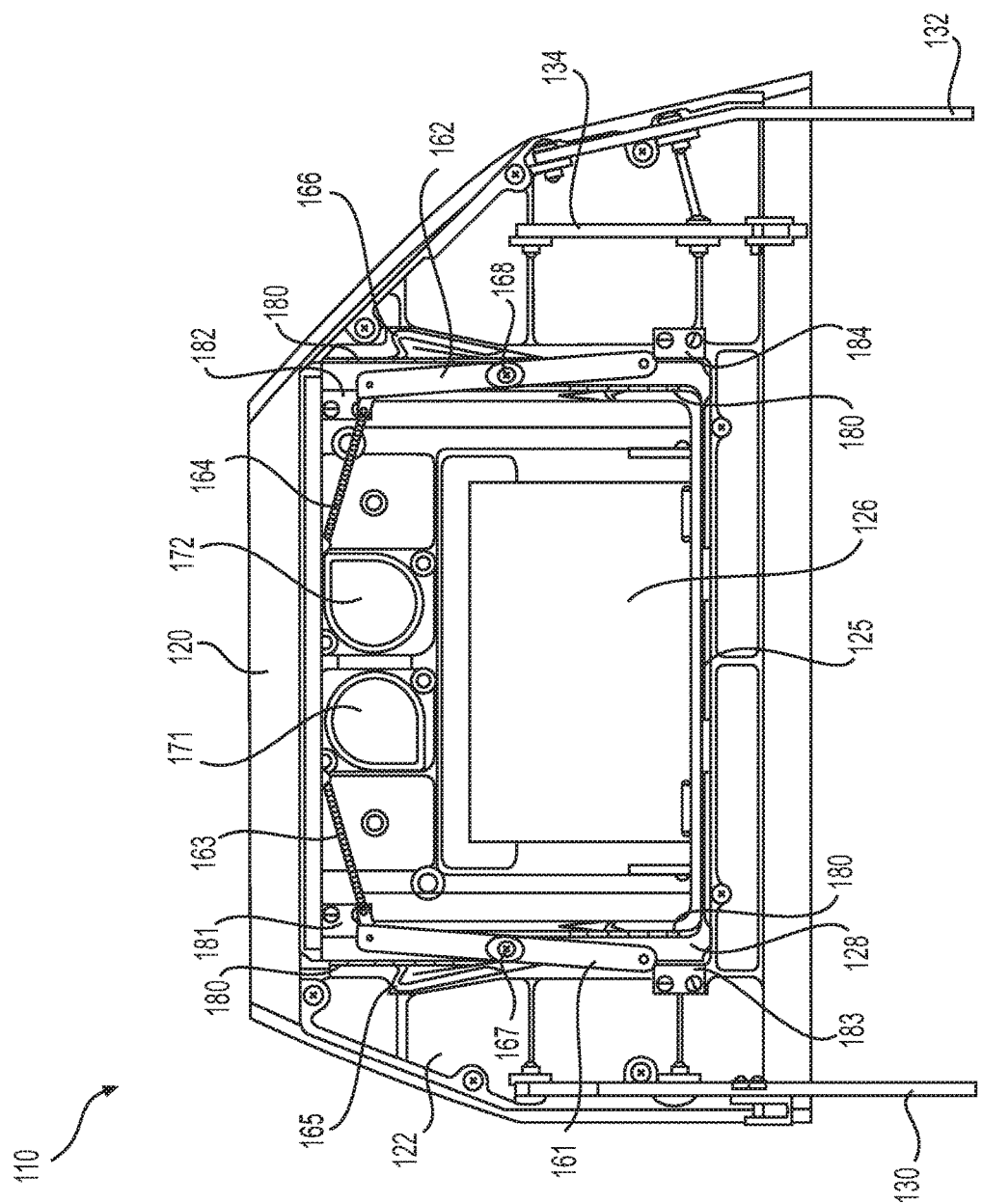
FIG. 6 is an underside view of the footrest of FIG. 1 with the footpad in the fully retracted position.
Figure 7:
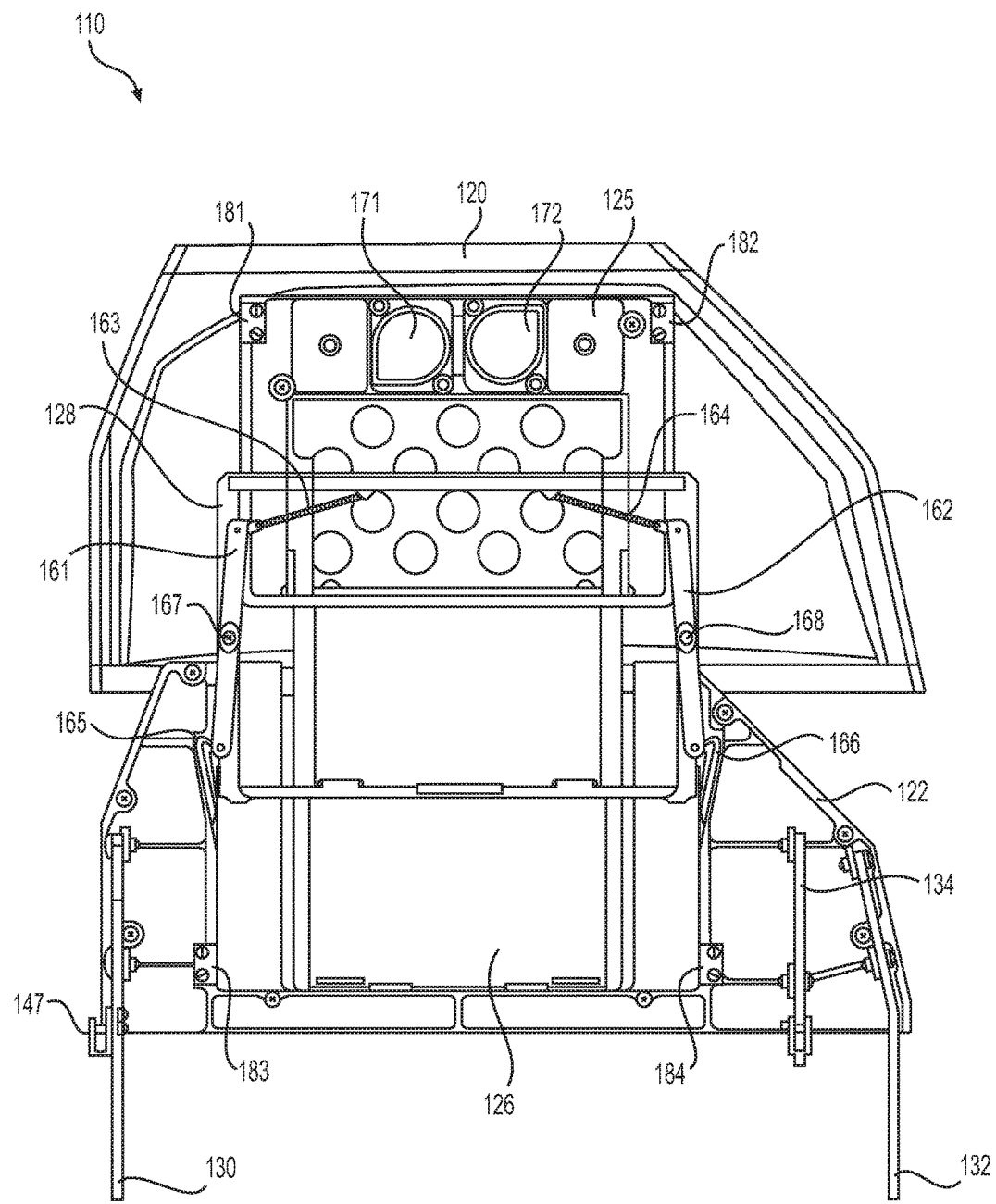
FIG. 7 is an underside view of the footrest of FIG. 1 with the footpad in the fully deployed position.

FIG. 6 is an underside view of footrest 110 with footpad 120 in a retracted position. FIG. 7 is an underside view of footrest 110 with footpad 120 in an extended position. FIGS. 6 and 7 are best viewed together with the following description.

A second arcuate member 132 is similar to first arcuate member 130 and located on an opposite side of footrest plate 122. In certain embodiments, a middle support 134 may be configured to mechanically couple with a gas spring assembly for raising footrest plate 122 (see e.g., second gas spring assembly 148, FIG. 11).

Footpad 120 extends via a telescoping slide mechanism embedded within footrest plate 122, which includes an inner slide 125 adapted to slide within a middle slide 128, which is further adapted to slide within footrest plate 122. Ball bearings 180 (see FIG. 6) are positioned between inner slide 125 and outer rails of middle slide 128 for providing smooth sliding motion therebetween. Ball bearings 180 are also located along outer edges of middle slide 128 and inside rails of footrest plate 122. Ball bearings are secured via bearing caps, such as a first bearing cap 181, a second bearing cap 182, a third bearing cap 183, and a fourth bearing cap 184. Movement of middle slide 128 within footrest plate 122 and movement of inner slide 125 within middle slide 128 may be said to provide a telescoping slide mechanism. A closeout panel 126 is configured to cover any gap between inner slide 125 and footrest plate 122 while footpad 120 is in the extended position.

A first touch-latch member 161 and a second touch-latch member 162 are configured for locking footpad 120 in the extended position, as depicted in FIG. 7. First touch-latch member 161 is for example a pivoting member that is biased to pivot via a spring 163 about a pivot axis 167. Spring 163 is for example a coil spring, but could be another type of biasing mechanism. Spring 163 is coupled to a first end of the pivoting member and to some portion of footrest plate 122 (e.g., middle slide 128). A second end of the pivoting member includes a protruding pin configured to travel within a curved groove 165 in the underside of footrest plate 122. Second touch-latch member 162 is a mirror-image replica of first touch-latch member 161, having a pivoting member that is biased to pivot via a spring 164 about a pivot axis 168. Spring 164 is attached to a first end of the pivoting member and a protruding pin extends from the second end configured to travel within curved groove 166.

In operation, when footpad 120 is pushed to an extended position as depicted in FIG. 7, springs 163, 164 cause touch-latch members 161, 162 to pivot such that the protruding pins travel in into a bend portion of their respective curved groove 165, 166, such that touch-latch members 161, 162 secure footpad 120 in the extended position. Footpad 120 is released by pushing footpad 120 slightly past the extended position. This causes the protruding pins to move out of the bend portion of curved grooves 165, 166 and to a return portion of the curved grooves 165, 166 due to bias of springs 163, 164. This allows footpad 120 to be retracted, as depicted in FIG. 6 and further described below. In certain embodiments, curved grooves 165, 166 include more than one bend for receiving a respective protruding pin of first and second touch-latch members 161, 162 to provide more than one extended position (e.g., partially extended positions).

A first retracting cable reel 171 and a second retracting cable reel 172 unwind when footrest 110 is moved to an extended position. Upon pushing footpad 120 to full extension to release footpad 120, the protruding pins of first and second touch-latch members 161, 162 move from the bend portion to the return portion of curved grooves 165, 166, enabling first and second retracting cable reels 171, 172 to retract footpad 120 via cables. First and second retracting cable reels 171, 172 each include a cable wound around a pivot axis, and a torsion spring that spring-loads the cable reel about the pivot axis. Upon extension of footpad 120, each torsion spring is loaded, and upon release of footpad 120, each torsion spring winds its respective cable to retract footpad 120.

Figure 8:
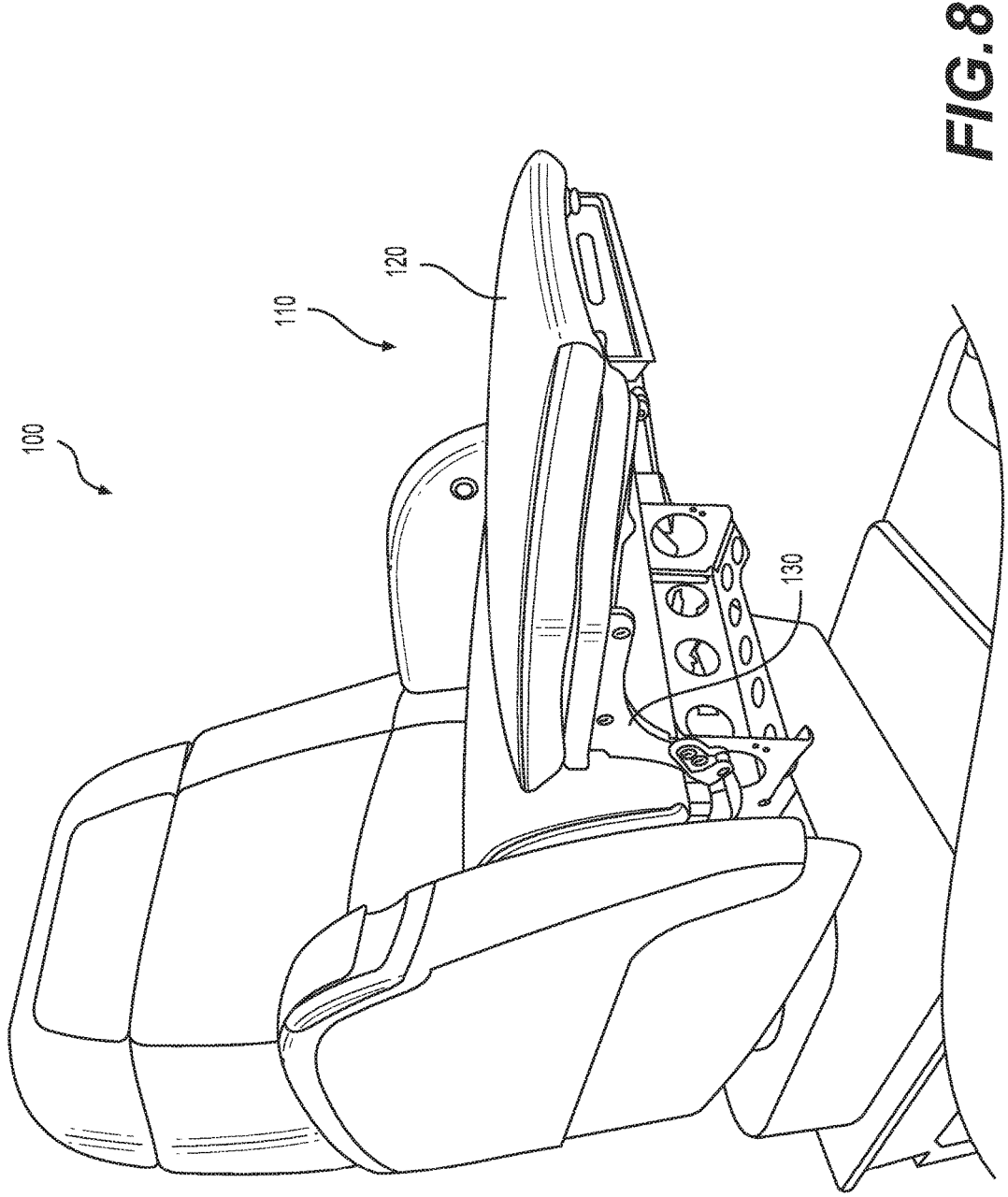
FIG. 8 is a perspective view of a seat having a footrest, in an embodiment.
Figure 9:
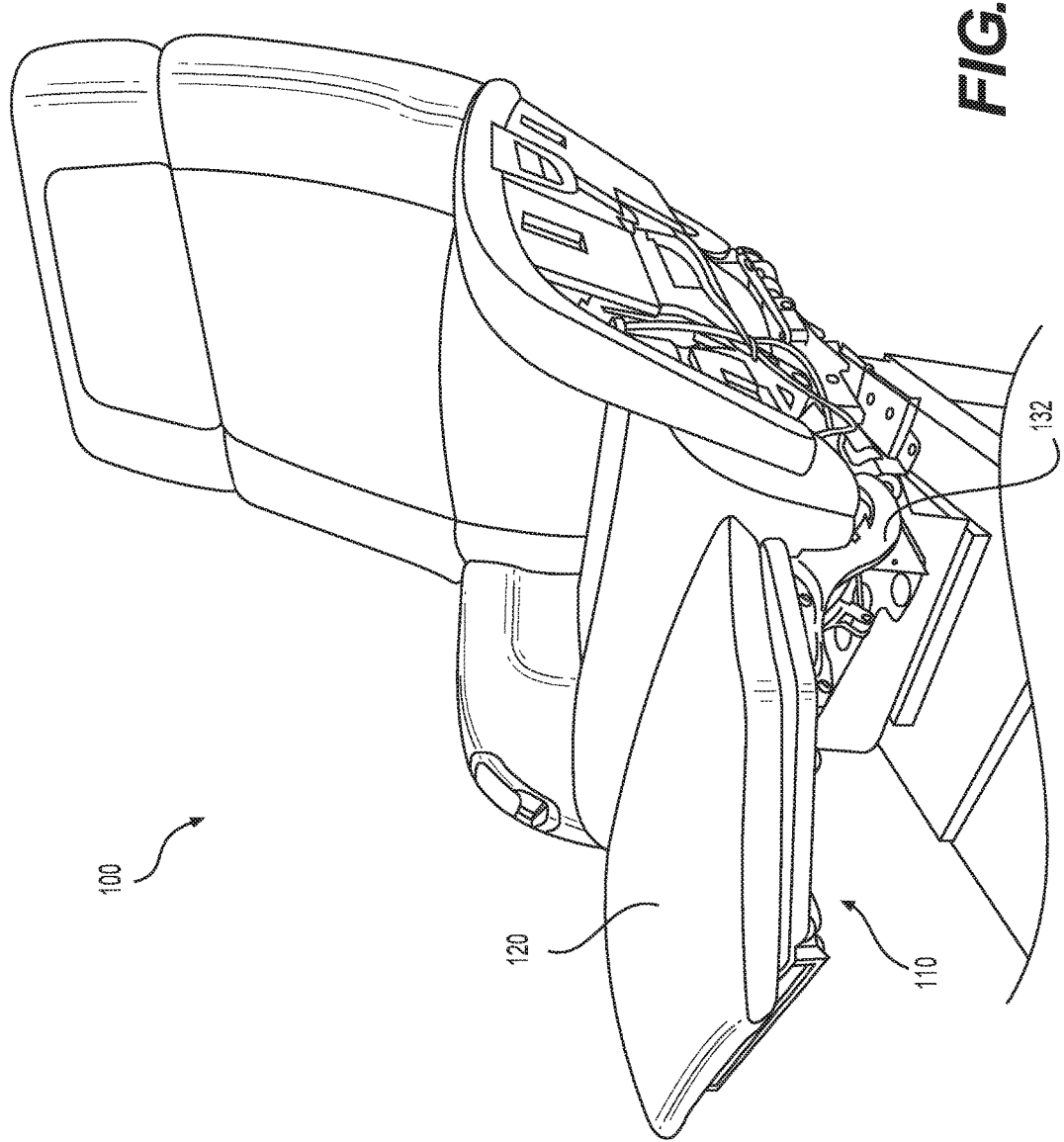
FIG. 9 is another perspective view of the seat and footrest of FIG. 8.

FIGS. 8 and 9 are perspective views of seat 100 and footrest 110. As depicted in FIGS. 8 and 9, footrest 110 is oriented in a fully extended position, while footpad 120 is in the fully retracted position (e.g., the same configuration as FIG. 2.). Footrest 110 is mechanically coupled to first arcuate member 130 (see FIG. 8) and second arcuate member 132 (see FIG. 9).

Figure 10:
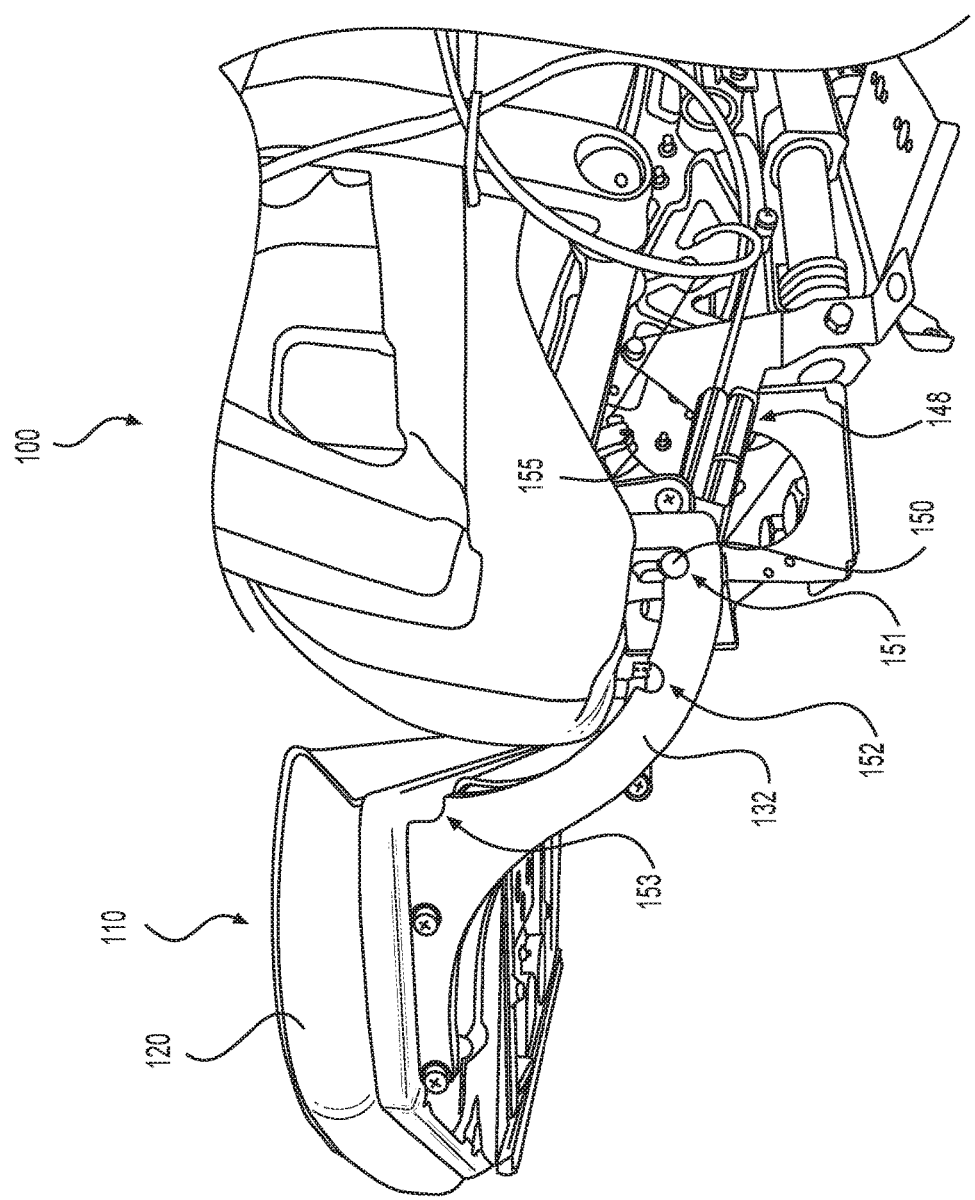
FIG. 10 is a side view of the seat and footrest of FIG. 8.

FIG. 10 is a side view of seat 100 and footrest 110. Second arcuate member 132 includes at least one notch for accepting a lock pin 150. For example, a first notch 151 is configured to maintain footrest 110 in the fully deployed position as depicted in FIG. 10, such that footpad 120 is oriented horizontally (e.g., about ninety degrees from vertical). A second notch 152 is configured to maintain footrest 110 in a partially deployed position such that footpad 120 is oriented for reclining (e.g., about sixty degrees from vertical). A third notch 153 is configured to maintain footrest 110 in a stowed position such that footpad 120 remains stowed beneath seat 100 (e.g., about vertically oriented). An occupant may lock footrest 110 in one of the orientations provided by first, second, and third notches 151, 152, 153, and to unlock footrest 110 for moving to a different orientation via lock pin 150.

First, second, and third notches 151-153 are intended to be exemplary only, and it is to be understood that second arcuate member 132 may include more than two notches for providing more than two partially deployed positions, and the location of the notches may be varied for providing different reclining angles of footpad 120, without departing from the scope hereof. First arcuate member 130 may also include notches for receiving a lock pin, with the notch locations matching those of second arcuate member 130. Lock pin 150 may be lifted to release from, and is biased to insert into one of, first, second and third notches 151-153. Lock pin 150 is for example spring biased to automatically insert into an aligned notch, and released via a release cable 155. Release cable 155 is for example a user-actuated release cable coupled to a lever located in armrest 106. A second gas spring assembly 148, which is an example of first gas spring assembly 140 of FIG. 4, is adapted for extending footrest 110 when lock pin 150 is released from notches 151-153.

Figure 11:
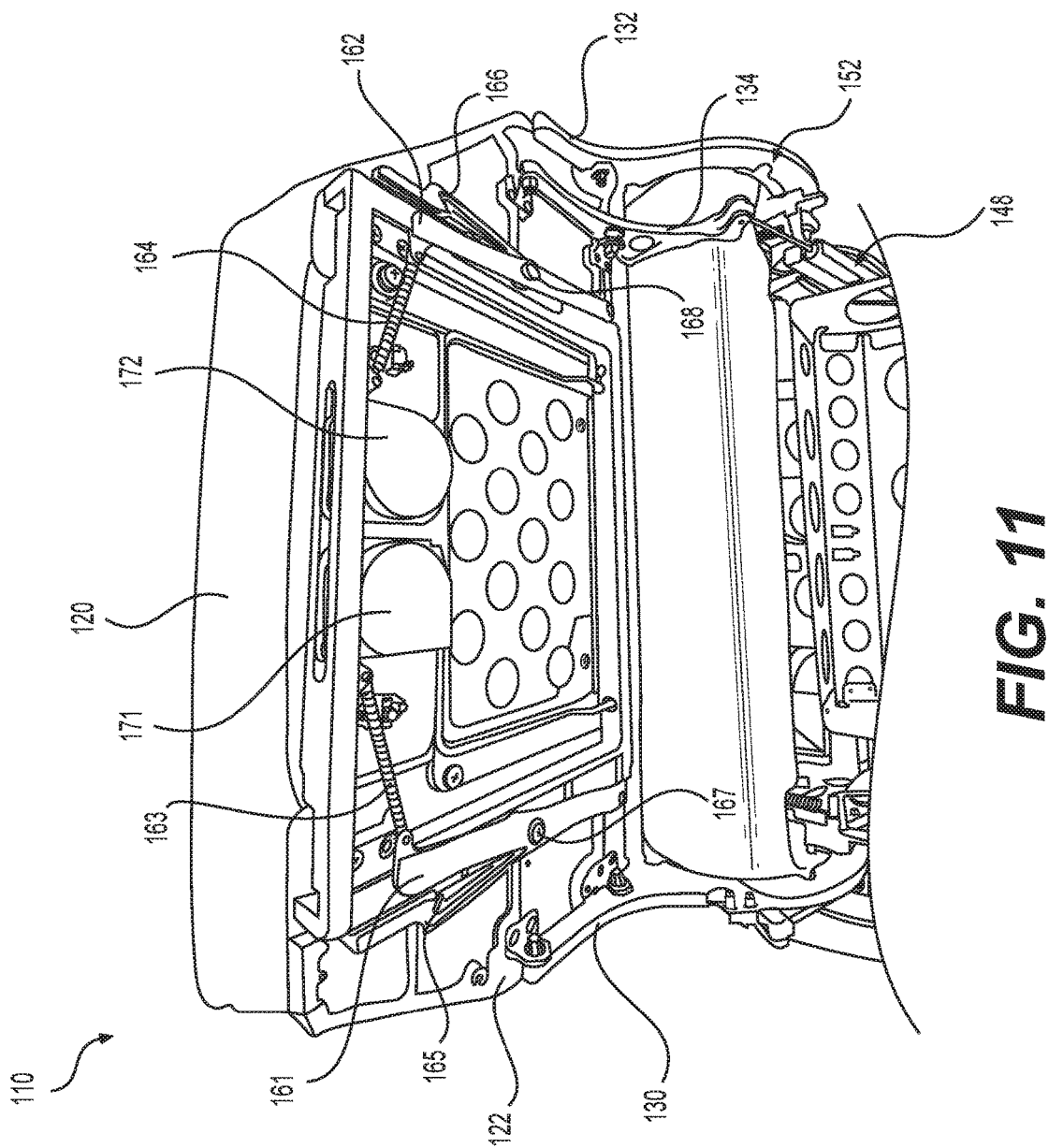
FIG. 11 is an underside view of the seat and footrest of FIG. 8 with a footpad in the fully retracted position.

FIG. 11 is an underside view of footrest 110 with footpad 120 in the fully retracted position. Footrest plate 122 provides structural support for footrest 110. First arcuate member 130 and second arcuate member 132, located on opposite sides footrest plate 122, enable extending footrest 110 from seat 100. Middle support 134 is mechanically coupled to second gas spring assembly 148 configured for extending footrest 110.

First retracting cable reel 171 and second retracting cable reel 172 unwind when footrest 120 is extended. Upon release of release pin 150 from first notch 151, first and second retracting cable reels 171, 172 retract footrest 120 via cables. Footrest 110 may include more than one gas spring assembly (e.g., one on each side of footrest 110). Similarly, first arcuate member 130 and second arcuate member 132 may both include matching notches for receiving matching release pins.

Figure 12:
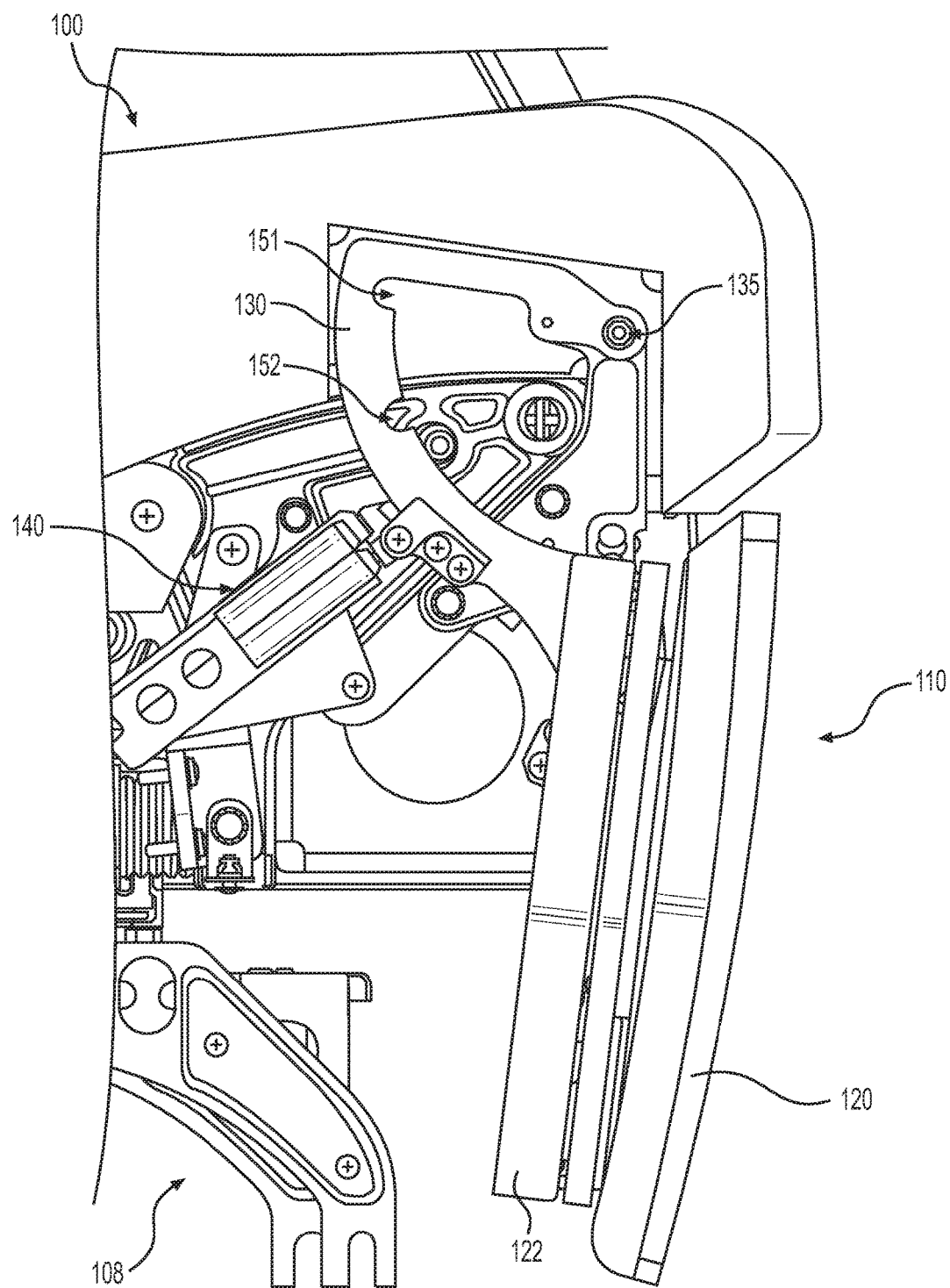
FIG. 12 is a side view showing the seat of FIG. 1 with the footrest in the stowed position, and the armrest and a portion of the seat removed to enable viewing of internal components.

FIG. 12 is a side view showing seat 100 with the footrest in the stowed position and portions of seat 100 removed to enable viewing of internal components. Specifically, a pivot axis 135 mechanically couples first arcuate member 130 to seat 100. A torsion spring is adapted to provide a biasing torque for rotating first arcuate member 130 to initiate deployment of footrest 110. First arcuate member includes a first notch 151 and a second notch 152 for receiving lock pin 150, which are the same as those of second arcuate member 132, described above in connection with FIG. 10.

In operation, footrest 110 may be released from the stowed position by release of lock pin 150 from first notch 151. Lock pin 150 may be released via an occupant actuated cable mechanism (e.g., release cable 155, FIG. 10). Both sides of footrest 110 may include the occupant actuated lock pin 150 for insertion into notches of first and second arcuate members 131, 132. Torsion springs coupled to a pivot axis of first arcuate member 131 (see pivot axis 135, FIG. 12) and a pivot axis of second arcuate member 132 (not shown) initiate a pivoting movement of footrest 110 outwards and away from seat 100. Once footrest 110 is partially deployed, gas springs drive footrest 110 outwards and upwards to raise footrest 110. After the occupant lets go of the actuated cable mechanism, lock pin 150, which is biased downward, enters the next available notch in first or second arcuate member 131, 132. In this manner, the occupant may select the degree to which footrest 110 is extended (e.g., partially or fully).

To extend footpad 120, the occupant pushes footpad 120 away from seat 100. When an extended position is reached, first and second touch-latch members 161, 162 are configured to lock footpad 120 in the extended position. To release footpad 120, the occupant presses the footpad 120 to a fully extended position (e.g., just past the extended position) which releases first and second touch-latch members 161, 162 from their locked positions. First and second retracting cable reels 171, 172 then retract footpad 120 via cables.

To retract footrest 110 to the stowed position, the occupant first releases lock pin 150 via the occupant actuated cable mechanism, and then pushes down (e.g., with one or both feet) until lock pin 150 engages with first notch 151.

Embodiments of the footrest disclosed herein are configured to support feet of both short and tall occupants (e.g., up to six feet tall) and to be easily deployed and stowed. Certain embodiments include a break-over mechanism that prevents damage to the footrest extension mechanism (e.g., gas spring assembly 140) if a large load is placed on the footrest. The break-over mechanism is designed to release the spring-loaded lock pins at a pre-determined load. This feature enables lock pin 150 to release, making footrest 110 retract to the stowed position automatically if too great a load is placed on the end of footrest 110 when extended.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A seat footrest, comprising:
   an arcuate member mechanically coupled to a footpad by a first end and pivotally coupled to a seat frame by a second end, opposite the first end, wherein the arcuate member is adapted for pivoting the footpad between a stowed position and one or more deployed positions;
   a lock pin for releasably inserting into a first notch of the arcuate member for securing the footpad in the stowed position and one or more additional notches of the arcuate member for securing the footpad in the one or more deployed positions;
   a first biasing member adapted for initiating deployment of the footpad upon release of the lock pin from the first notch; and
   a second biasing member adapted for completing deployment of the footpad by raising the footpad to the one or more deployed positions such that the lock pin inserts into the one or more additional notches, respectively.

2. The seat footrest of claim 1, wherein the one or more deployed positions includes a horizontal position of the footpad.

3. The seat footrest of claim 2, wherein the one or more deployed positions includes a reclining position of the footpad between the stowed position and the horizontal position.

4. The seat footrest of claim 1, wherein the first biasing member includes a torsion spring coupled to the second end of the arcuate member.

5. The seat footrest of claim 1, wherein the second biasing member is a dual gas-spring assembly mechanically coupled between the seat frame and the arcuate member.

6. The seat footrest of claim 1, further comprising a telescoping mechanism for extending the footpad to an extended position when deployed in the one or more deployed positions.

7. The seat footrest of claim 6, wherein the telescoping mechanism slides into a recess of a supporting plate on an underside of the footpad for retracting the footpad to a retracted position.

8. The seat footrest of claim 6, further comprising a touch latch for locking the telescoping mechanism in the extended position and unlocking the telescoping mechanism from the extended position.

9. The seat footrest of claim 8, the touch latch comprising:
   a pivoting member having a spring bias at a first end, a protruding pin at a second end opposite the first end, and a pivot axis between the first end and the second end,
   the pivot axis being coupled to the telescoping mechanism;
   the protruding pin being inserted into a track of the footpad for guiding the pivoting member upon sliding of the telescoping mechanism, the track having a bend for receiving the pin such that the pivoting member maintains the slide mechanism in the extended position; and
   the spring bias adapted to rotate the pivoting member for moving the protruding pin out of the bend upon fully extending the telescoping mechanism, thereby releasing the footpad for retracting.

10. The seat footrest of claim 6, further comprising at least one retracting cable reel adapted to retract the telescoping mechanism.

11. The seat footrest of claim 1, further comprising a release mechanism coupled to the lock pin for disengaging the lock pin for freeing the arcuate member for deployment and stowing.

12. A stowable footrest for a seat, comprising:
   a footpad having a supporting member;
   a first arcuate member mechanically coupled to a first side of the supporting member;

a second arcuate member mechanically coupled to a second side of the supporting member, opposite the first side;

the first arcuate member and the second arcuate member being pivotably coupled to a seat frame for pivoting the footpad between a stowed configuration and a plurality of deployed configurations;

at least one of the first arcuate member and the second arcuate member having a first notch corresponding to the stowed configuration and a plurality of additional notches each corresponding to a respective one of the plurality of deployed configurations;

a lock pin for inserting into one of the first notch or the plurality of additional notches for securing the footpad in the stowed configuration or in the plurality of deployed configurations, respectively; and a telescoping slide embedded in the supporting member for extending a position of the footpad away from the seat.

13. The stowable footrest of claim 12, wherein the plurality of deployed configurations include a substantially horizontal configuration and a reclining configuration, the reclining configuration being between the substantially horizontal configuration and the stowed configuration.

14. The stowable footrest of claim 12, wherein the lock pin is spring-loaded to engage in one of the first notch or the plurality of additional notches, and the lock pin is mechanically coupled to a release cable for enabling the lock pin to disengage from one of the first notch or the plurality of additional notches.

15. The stowable footrest of claim 12, wherein the telescoping slide further comprises a latch biased to actuate to a first position when the footpad is extended for maintaining the footpad in an extended position, the latch being further biased to actuate to a second position when the footpad is pressed to a full extension enabling retraction of the footpad.

16. The stowable footrest of claim 12, wherein the telescoping slide further comprises a cable reel, the cable reel being spring loaded to retract the footpad within the footrest supporting member upon the footpad being pressed to the full extension.

17. The stowable footrest of claim 12, wherein the telescoping slide further comprises an inner slide, which is slidably connected within a middle slide, which is slidably connected within the supporting member.

18. The stowable footrest of claim 12, further comprising a first torsion spring mechanically coupling the first arcuate member to the seat frame, and a second torsion spring mechanically coupling the second arcuate member to the seat frame, the first and second torsion springs adapted to initiate deployment of the footpad upon disengaging of the lock pin from the first notch.

19. The stowable footrest of claim 12, further comprising a dual gas-spring assembly mechanically coupled between the seat frame and the arcuate member for raising the footpad to one of the plurality of deployed configurations.

20. The stowable footrest of claim 19, the dual gas-spring assembly further comprising a first gas spring oriented anti-parallel with a second gas spring.

* * * * *